United States Patent
Watts

[15] 3,648,480
[45] Mar. 14, 1972

[54] AIR CONDITIONING IN CONJUNCTION WITH INTERNAL COMBUSTION ENGINE

[72] Inventor: Cleal T. Watts, 6733 Country Club Circle, Dallas, Tex. 75214

[22] Filed: Jan. 30, 1970

[21] Appl. No.: 7,050

[52] U.S. Cl. ............................62/268, 180/54 A X, 62/314, 62/323, 98/2
[51] Int. Cl. ..................................................F25b 19/00
[58] Field of Search ....................123/41.01; 180/54 A, 54 X, 180/1; 62/304, 306, 314 X, 323, 268

[56] References Cited

UNITED STATES PATENTS

| | | | |
|---|---|---|---|
| 1,826,471 | 10/1931 | James | 180/54 A X |
| 2,500,527 | 3/1950 | Demuth | 62/314 |
| 2,717,773 | 9/1955 | Gregg | 62/314 |
| 2,959,032 | 11/1960 | Davis | 62/314 |
| 3,139,073 | 6/1964 | White et al. | 123/41.5 |

FOREIGN PATENTS OR APPLICATIONS 545,944  7/1956  Italy.....................................60/39.49

*Primary Examiner*—Laurence M. Goodridge
*Assistant Examiner*—Cort Flint
*Attorney*—Birch, Swindler, McKie & Beckett

[57] ABSTRACT

An air conditioning system wherein air under pressure is derived from an air manifold on an internal combustion engine. The source of air pressure may be a turbocharger, a supercharger or other air pressure means driven by the engine. The air is forced into a primary coil or heat exchanger, preferably in front of the engine radiator, and is cooled to ambient or nearly ambient temperature. The air then passes through a coil in a reduced pressure water vapor cooler and thence outwardly through an insulated line and an orifice in the end thereof. The expansion of air emitted from the orifice is then directed to the space to be cooled. A feature of the invention has to do with the reduced pressure water vapor cooler which is connected with vacuum means created by the engine, for example, a venturi in the exhaust.

5 Claims, 4 Drawing Figures

Patented March 14, 1972 3,648,480
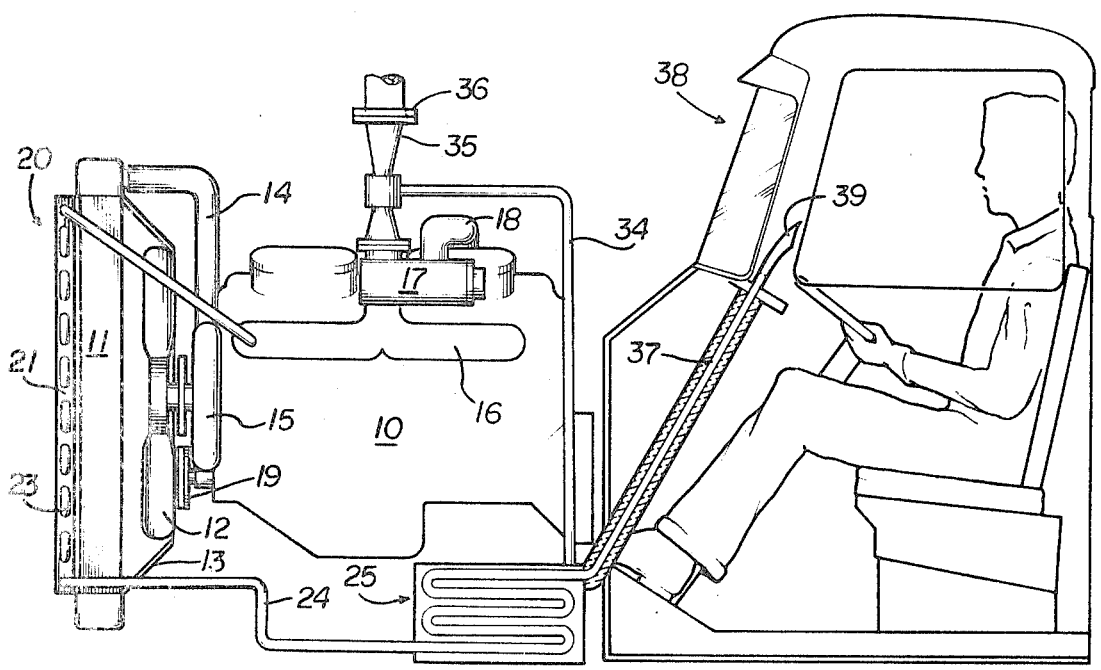
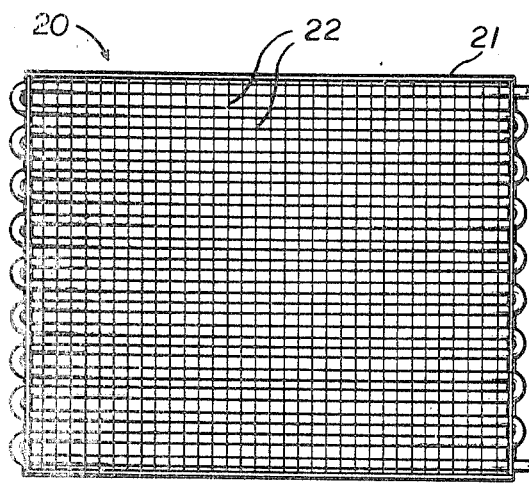
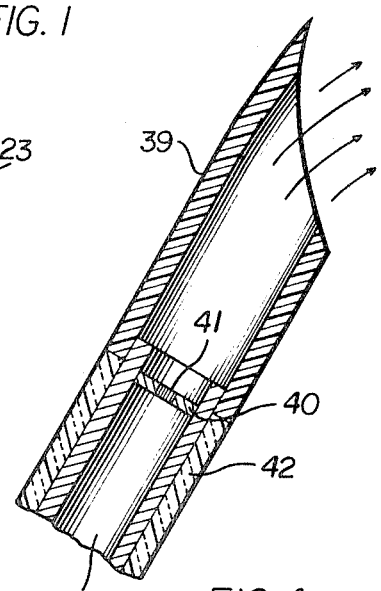
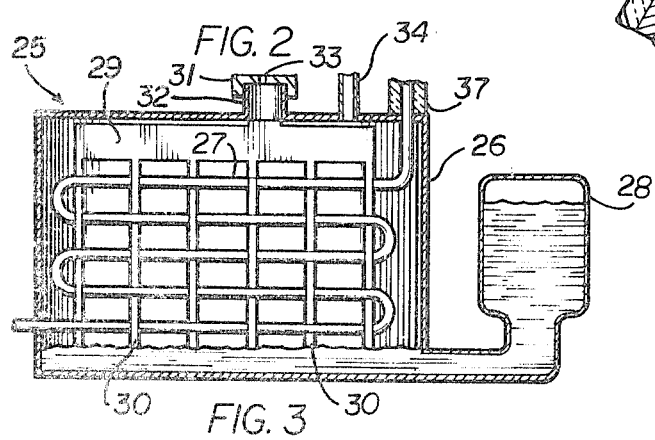
CLEAL T. WATTS
INVENTOR
BY Herbert J. Brown
ATTORNEY

AIR CONDITIONING IN CONJUNCTION WITH INTERNAL COMBUSTION ENGINE

This invention relates to air-conditioning systems operated by internal combustion engines primarily intended for another purpose, such as a prime mover for a tractor or truck.

An object of the invention is to provide an air conditioner system in combination with a fuel supplied prime mover, and which system has no moving parts, thereby effecting economy of construction and simplicity of operation.

Another object is to provide a system of the described class which requires little, if any, additional power for compressing and flowing the refrigerant.

Another object is to provide an air-conditioning system in accordance with the foregoing and wherein additional cooling is effected by flowing the refrigerant through a reduced pressure water vapor cooler after it has passed through a primary cooling coil.

An additional object of the invention is to provide a water vapor cooler as last referred to wherein a partial vacuum is created by means of a venturi connected with the exhaust of the engine.

These and other objects of the invention will become apparent from the following description and the accompanying drawing, in which:

FIG. 1 is a schematic side view, partly in section, of an engine, vehicle cab and an example of the present air-conditioning system.

FIG. 2 is a front elevational view of the primary cooler or heat exchanger.

FIG. 3 is a vertical longitudinal sectional view of the reduced pressure evaporator cooler, and FIG. 4 is an enlarged vertical sectional view of the upper end of the air discharge line and the nozzle attached thereto.

In the drawing, the numeral 10 generally indicates a diesel engine including a radiator 11, fan 12, fan cowl 13, radiator hose 14 and water pump 15. An air manifold 16 is a conventional part of the diesel engine 10 and is supplied with air, under pressure by a turbocharger 17 or other means of providing pressurized air such as a supercharger, not shown. The intake of the turbocharger 17 is indicated at 18. Also shown in the drawing, there is a drive pulley 19 for turning the fan 12 by means of a belt, not shown.

An air conditioner system according to the invention includes a primary cooling coil 20 of the serpentine type mounted in front of the radiator 11 and is comprised of a rectangular frame 21, vertical fins 22 connected with the top and bottom of the frame and a tube 23 extending back and forth through the sides of the frame and through the fins. The upper end of the tube 23 is connected with the pressurized air manifold 16, whereas the lower end of the tube is connected by a line 24 with a reduced pressure water vapor cooler 25.

As shown in FIG. 3, the vapor cooler 25 includes a case 26, a serpentine coil 27 therein and a water reservoir 28 outwardly of and connected with the bottom of the case. The reservoir 28 is of the inverted jar type and is above the bottom of the case 26 whereby a constant water level is maintained until the reservoir is empty. The reservoir may be filled by suitable means, not shown, such as disconnecting the reservoir from the case.

The serpentine coil 27 in the vapor cooler 25 is supported on a sheet metal holder 29 having depending fingers 30 which are laced through the horizontal lengths of the coil. A filler cap 31 is mounted on a neck 32 in the top of the case and has a small vent hole 33 for allowing only a small amount of air to enter the case 26. Also extending from the top of the case 26 there is a vacuum line 34 connected with a venturi 35 in the exhaust 36 of the engine 10.

A discharge line 37 extends from the top of the case 26 into the vehicle cab 38 where it is provided with a curved nozzle 39 for directing the discharged air in the desired direction. A disc 40 is mounted in the line 37 near its discharge end and has a central orifice 41 for expanding the air immediately after it passes therethrough. The discharge line 37 may be covered with insulating material 42.

In operation, air under pressure from the air manifold 16 first passes through the primary cooler 20 where it is reduced to ambient or near ambient temperature. The air then passes through the coil 27 of the reduced pressure water vapor cooler 25 and outwardly through the discharge line 27 where it cools the interior of the vehicle cab 38. The partial vacuum applied to the interior of the vapor cooler 25 by the venturi 35 accelerates vaporization and thereby lends to reducing the temperature of the air within the coil 27.

What is claimed is:

1. An air-conditioning system for a vehicle having an internal combustion engine comprising:
    a source of air under pressure,
    a first ambient air cooler connected at one end to said source of air to cool the air to approximately ambient air temperature,
    a second reduced pressure water vapor cooler to further cool the air,
    said vapor cooler comprising a case having a coil therein through which the air passes connected at one end to said first cooler,
    a vacuum line connected to said case to reduce the air pressure and create a partial vacuum in said case around said coil,
    reservoir means for supplying water to said case, and
    a discharge line connected at one end to the remaining end of said coil in said vapor cooler.

2. An air-conditioning system for a vehicle according to claim 1, wherein said vacuum line is connected with a venturi in the exhaust system of said engine to create a source of vacuum.

3. An air-conditioning system for a vehicle according to claim 1 wherein said discharge line includes an orifice therein prior to the point at which the air is discharged.

4. An air-conditioning system for a vehicle according to claim 1 wherein said first cooler includes a coil through which the air passes.

5. An air-conditioning system for a vehicle having an internal combustion engine comprising:
    a source of air under pressure,
    a first ambient air cooler having a coil through which the air passes to be cooled to approximately ambient temperature connected at one end to said source of air,
    a second reduced pressure water vapor cooler to further cool the air,
    said vapor cooler comprising a case having a coil therein through which the air passes connected at one end to the remaining end of said coil in said first cooler,
    a vacuum line connected to said case to reduce the air pressure and create a partial vacuum in said case around said vapor cooler coil,
    a venturi in the exhaust system of said engine connected to said vacuum line to create a source of vacuum,
    reservoir means for supplying water to said case,
    a discharge line connected at one end to the remaining end of said vapor cooler coil, and
    an orifice in said discharge line prior to the point at which the air is discharged.

* * * * *